(No Model.)
W. M. HAWKINS.
BACK BAND HOOK.
No. 520,162. Patented May 22, 1894.
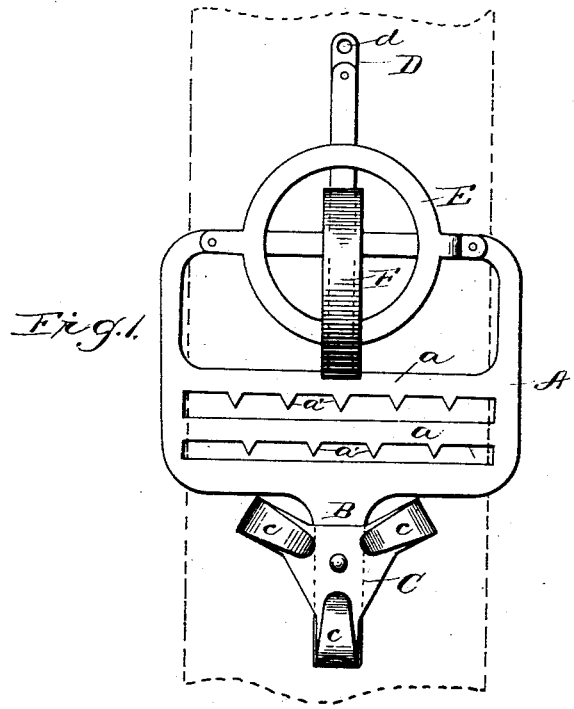
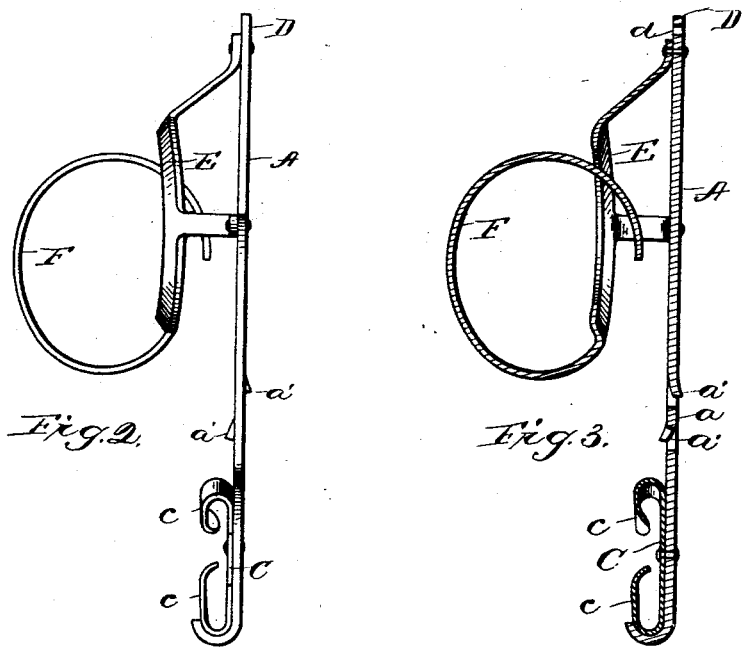

UNITED STATES PATENT OFFICE.

WILLIAM M. HAWKINS, OF TRENTON, NORTH CAROLINA.

BACK-BAND HOOK.

SPECIFICATION forming part of Letters Patent No. 520,162, dated May 22, 1894.

Application filed October 17, 1893. Serial No. 488,369. (No model.)

*To all whom it may concern:*

Be it known that I, WILLIAM M. HAWKINS, of Trenton, in the county of Jones and State of North Carolina, have invented certain new and useful Improvements in Back-Band Hooks; and I do hereby declare the following to be a full, clear, and exact description of the same, reference being had to the accompanying drawings, forming a part of this specification, and to the letters of reference marked thereon.

This invention relates to improvements in hooks, such as are usually employed on plow harness, to support the traces and lines or reins, the objects being to provide a simple structure not liable to become useless by breakage and with which the lines may easily be engaged or disengaged without threading them through from the end.

Referring to the accompanying drawings: Figure 1 is a plan of a device constructed in accordance with my invention. Fig. 2 is a side elevation of the same. Fig. 3 is a central vertical section.

Similar letters of reference in the several figures indicate the same parts.

The letter A indicates the body of the device formed with at least two cross bars or equivalents $a\ a$ at the bottom, and provided with teeth $a'\ a'$ on their lower edges for co-operating with the band to hold the device in place. At the bottom there is a depending support B preferably somewhat hook shape at the lower end and adapted for the accommodation of a rotary hook head C having a series, preferably three hooks $c$ thereon of proper shape to engage and support the trace. Thus, should any one of the hooks become injured or worn, as is commonly the case with this class of devices, another may be turned into operative position, thereby materially prolonging the life and usefulness of the device. Above the cross bars, the body may be provided with an upward extension D having an opening $d$ therein through which a cord may be passed and tied to the back band to afford additional security against slipping and on an elevated portion E of the frame, I mount the line or rein hook F. This rein or line hook F, it will be observed has its point turned in toward the body of the device, and the object in forming the elevated portion E of the frame is to enable the point of the hook to be depressed below the level of the sides of the elevated portion and thereby prevent the accidental escape of the lines or reins which will pass straight through, while permitting them to be readily inserted or removed when desired by forming a sharp bend or loop and catching it over the end of the hook.

In the preferred construction, the portion E of the frame constitutes an elevated annulus or guard and the hook F secured to or forming a part of its lower side, has its hook point bent down at the center of and below the plane of the annulus. With this arrangement, nothing is liable to get caught at the point of the hook to prevent the entry of the loop of the lines or reins and the latter when straightened out as when in use, cannot escape and become entangled in the harness.

Ordinarily I prefer to manufacture the hooks out of some of the numerous alloys, not liable to rust and either by casting, forging or cutting, but it will be understood that I do not wish to be limited in this respect nor in respect to the particular shape of the frame inasmuch as it may be solid, except as before specified, of half round metal as shown or flat, without departing from the invention in the least.

In use, the back band is passed up around the cross bars so as to cause the teeth to engage therewith as shown, and a cord is preferably passed through the aperture at the top and connected with the band. The trace may be hooked on any one of the hooks found most suitable and the line or rein doubled, caught over the point of the hook and allowed to straighten out when it cannot escape. The depending hook support it will be noted curves forward at the bottom, and serves as a brace for the hook being used, and hence the hooks themselves may be comparatively light.

Having thus described my invention, what I claim as new is—

1. As an improved article of manufacture, the herein described back band hook consisting of the body having a depending hook for the trace, the elevated portion forming an annulus and the line or rein hook secured to or forming part of the lower side of said annulus and having its end within the annulus and below the plane of the same; substantially as described.

2. As an improved article of manufacture the herein described back band hook consisting of the body having a depending hook support, the elevated portion forming an annulus, the line or rein hook having its end bent down within the annulus below the plane of the same and the rotatable hook head having a series of hooks carried by the depending hook support; substantially as described.

WILLIAM M. HAWKINS.

Witnesses:
JAS. F. WHITE,
I. A. SMITH.